March 14, 1961 A. F. SHIELDS 2,974,572
CUTTING AND CREASING PRESS WITH MOVABLE STOPS
Original Filed June 15, 1954 7 Sheets-Sheet 2

INVENTOR.
ALBERT F. SHIELDS
BY
ATTORNEYS

March 14, 1961  A. F. SHIELDS  2,974,572
CUTTING AND CREASING PRESS WITH MOVABLE STOPS
Original Filed June 15, 1954  7 Sheets-Sheet 3

INVENTOR.
ALBERT F. SHIELDS
BY
ATTORNEYS

March 14, 1961  A. F. SHIELDS  2,974,572
CUTTING AND CREASING PRESS WITH MOVABLE STOPS
Original Filed June 15, 1954  7 Sheets-Sheet 4

INVENTOR.
ALBERT F. SHIELDS
BY Ostrolenk, Faber,
Gerb & Soffen
ATTORNEYS March 14, 1961 A. F. SHIELDS 2,974,572
CUTTING AND CREASING PRESS WITH MOVABLE STOPS
Original Filed June 15, 1954 7 Sheets-Sheet 7

INVENTOR.
ALBERT F. SHIELDS
BY
ATTORNEYS

United States Patent Office 2,974,572
Patented Mar. 14, 1961

2,974,572

CUTTING AND CREASING PRESS WITH MOVABLE STOPS

Albert F. Shields, Forest Hills, N.Y., assignor to S & S Corrugated Paper Machinery Co., Inc., Brooklyn, N.Y., a corporation of New York Original application June 15, 1954, Ser. No. 436,937, now Patent No. 2,905,067, dated Sept. 22, 1959. Divided and this application Aug. 4, 1958, Ser. No. 753,163

24 Claims. (Cl. 93—58.3)

My present invention relates to improvements in cutting and creasing presses and is a continuation of my copending application, Serial 436,937, filed June 15, 1954, now U.S. Patent No. 2,905,067, issued September 22, 1959 and assigned to the assignee of the instant invention.

The device of the aforesaid patent includes a cam operated quadrant member for forcing sheets against a flat die. The device also includes means whereby sheets are automatically fed to a set of grippers carried by a feed slat which is moved intermittently along a closed loop path with the grippers engaging the sheet and remaining in engagement therewith during the entire cutting and creasing operation.

The instant invention is particularly directed toward means whereby the accuracy of the blank registration with both the grippers and the die is improved and this accuracy is maintained independently of the changing characteristics of the chain on which the feed slat is mounted, that is, slack and play between links change greatly due to wear and changes in temperature.

In the instant invention the feed bar is carried to the feed station where it is firmly positioned since the chain link secured to the feed bar is in engagement with the teeth of the driving sprocket. Thereafter, a movable sheet stop assembly is positioned relative to the grippers carried by the feed slat. When a sheet is fed between the jaws of the grippers, the stops of the stop assembly accurately position the sheet relative to the jaws. The position of the sheet relative to the grippers is always the same regardless of any slight variation of the feed slat positioned at the feed station since the stop assembly will always assume a predetermined position with respect to the grippers.

Also provided at the feed station is a tiltable feed table whose motion is synchronized with the motion of the feed slat as well as the opening and closing of the gripper jaws. That is, the front end of the feed table is tilted downward to permit the grippers to pass thereby as the grippers are moved into the feed station. Next, the feed table is tilted upward to a horizontal position slightly above the lower gripper jaw and thereafter the blank guided by the feed table, enters the grippers.

Just prior to the closing of the gripper jaws, the feed table is lowered slightly to a position just below the lower feed jaw and remains in this position as the blank is carried through the feed station by the feed slat. This tilting arrangement adds to the accuracy of registration between the sheets and the grippers.

The driving sprocket for the chain is located at the feed staation and pushes a portion of the chain with the feed slat carrying the sheet along a lower horizontal path. With this arrangement, the chain slack is concentrated in the lower flight of the chain. When the feed slat reaches the cutting station it is not held rigidly, as at the feed station, since the chain is slack in this region. However, as the pressure quadrant is rocked, just prior to its engagement with the blank, indexing measn carried the quadrant engages cooperating indexing means carried by the feed slat and moves the feed slat to a predetermined position relative to a quadrant. This predetermined position relative to the quadrant also establishes a predetermined position relative to the die so that sheets issuing from the cutting and creasing press will be of uniform quality.

The device of the instant invention includes many other improvements such as spring operated means to control the movement of the push rods which open and close the jaws of the grippers at both the sheet feeding station and a sheet stripping station where the sheets are removed from the grippers. This construction prevents breakage of the machine should a jam occur.

A further improvement resides in the manner in which the die and chase may readily be removed from the cutting and creasing press. Longitudinal tracks are provided whereby the die and chase may slide longitudinally, at one end of the machine, to which the die and chase may be secured so that after being moved horizontally from the position above the pressure quadrant, the die and chase may be tilted to a vertical position at the end of the machine where adjustments and changes in the die members may be conveniently accomplished.

Accordingly, a primary object of the instant invention is to provide a novel cutting and creasing press which insures the delivery of a uniform product even after various portions of the machine have undergone extensive wear.

A further object is to provide an improved sheet feeding means whereby positive control of the sheets is maintained all during the time when the cutting and creasing operation is in progress.

Still another object is to provide a cutting and creasing press having movable stop means.

A further object is to provide a cutting and creasing press having a tiltable feed table operated in synchronization with a sheet feeding means.

A still further object is to provide a sheet stop assembly which is positioned relative to the feed slat after the feed slat has been stopped at the feed position.

Yet another object is to provide indexing means between the feed slat and the pressure member whereby the feed slat is movable to a predetermined position with respect to the pressure member after the feed chain has brought the slat to the cutting station.

Still another object is to provide novel means whereby the die and chase may readily be removed from the cutting press for replacement and repair thereof.

Yet another object is to provide a resiliently loadable mechanism for opening of the sheet grippers.

These as well as other objects of the instant invention shall become readily apparent after reading the following description of the accompanying drawings in which:

Figures 4 and 5 are fragmentary cross-sections similar to Figure 2. In Figure 4 the stop assembly is raised, the gripper jaws are open, and the feed table is in its uppremost position. In Figure 5 the stop assembly is raised, the gripper jaws are closed, and the feed table is in its intermediate position.

Figure 1:
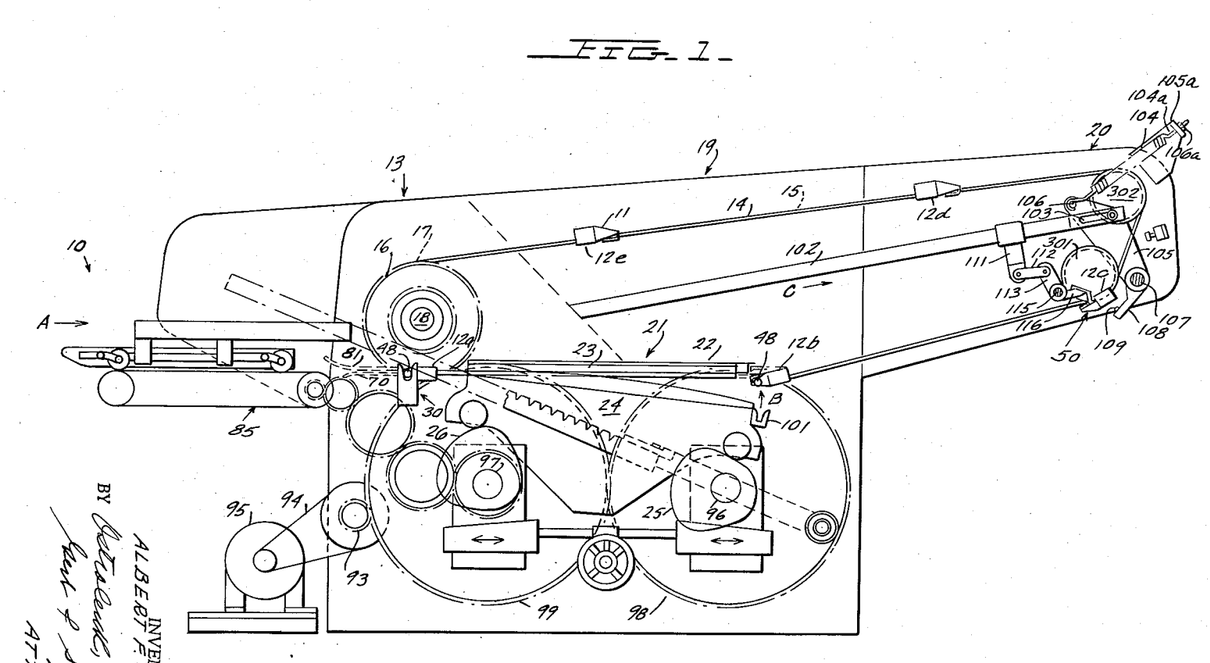
Figure 1 is a side elevation of the machine with the near side of the housing removed.

Referring more particularly to Figure 1, the device of the instant invention comprises a sheet feeding mechanism 10 positioned at the rear end of the device and is of the type described in my U.S. Patent 2,583,713, issued January 29, 1952, assigned to the assignee of the instant invention and entitled, "Feeding Mechanism for Folding Machines." This sheet feeding mechanism 10 feeds sheets one at a time from the bottom of a stack. Sheets delivered by the feeding device 10 are then engaged by grippers 50 carried by the feed bar 12a which is positioned at the sheet receiving station 13. The feed bars 12a—12e and grippers 11 are fully described in my copending application (S–115) Serial No. 684,797, filed September 9, 1957 and assigned to the assignee of the instant invention.

Feed bars 12a—12e are hollow members which extend transversely across the direction of travel (arrow A) of the sheets and are secured at the ends thereof to parallel continuous chains 14 and 15 which are positioned at opposite sides of the machine. Chains 14 and 15 are in engagement with driving sprockets 16 and 17, respectively, which are mounted on shaft 18. The paths of chains 14 and 15 are defined at the forward end of the machine by idler sprockets 301 and 302. A plurality of idler sprockets (not shown) support the lower flights of chains 14 and 15 between the positions occupied by slats 12a and 12b in Figure 1.

Intermittent rotary motion in a single direction is imparted to shaft 18 by suitable drive means such as the type illustrated in my copending application (S–108) Serial No. 585,461, filed May 17, 1956, now U.S. Patent No. 2,853,927 and assigned to the assignee of the instant invention. This drive means alternately supplies a positive driving motion and then applies a positive locking action. Thus, chains 14 and 15 are driven with an intermittent motion which enables feed slat 12a to successively stop at the sheet receiving station 13, at a cutting station 19, where feed bar 12b is shown in Figure 1; at a sheet stripping station 20, where feed bar 12c is shown in Figure 1, and at the positions occupied by feed bars 12d and 12e of Figure 1. The cutting station is positioned at the forward end of the cutting and creasing press 21 which comprises a member 22, for supporting a chase 23a whereon die 23 is mounted and a rockable quadrant pressure member 24 which is positioned below the die support member 22. Thus, when a feed slat 12a—12e carrying a sheet is stopped at cutting station 19, the sheet is positioned between die 23 and quadrant 24 so that quadrant 24, operated by cams 25, 26, may be rocked so as to force the sheet against the die 23. Thereafter, the cut and creased sheet is carried to stripping station 20 where the sheet is removed from the grippers 11. The rockable operation of quadrant 24 is fully described in my aforesaid patent No. 2,905,067.

The sheet receiving station

When chains 14, 15 are stopped so as to position feed slat 12a at feed station 13 the particular links of chains 14, 15 which are rigidly secured to feed slat 12a are in mesh with the teeth of driving sprockets 16, 17. Since driving sprockets 16, 17 are positively locked by the intermittent drive means, feed slat 12a is also locked in position.

Figure 2:
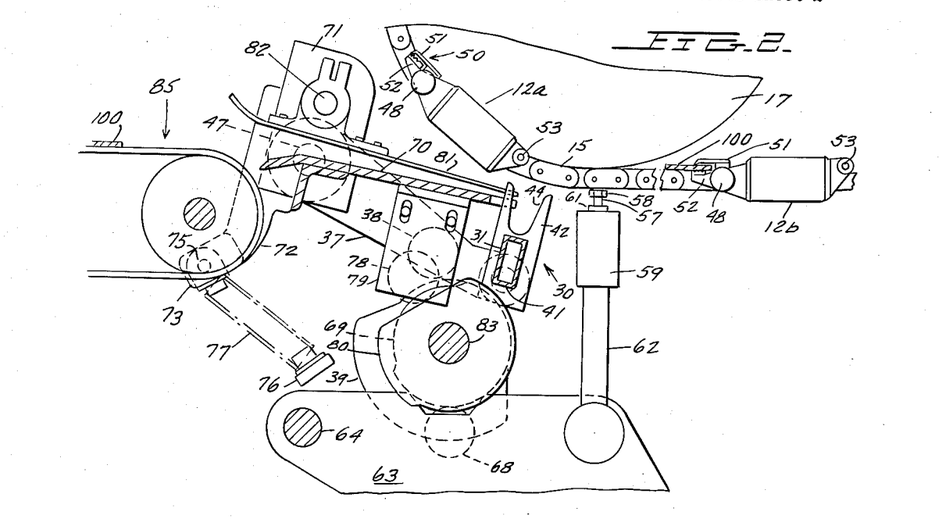
Figure 2 is a fragmentary cross-section taken in the region of the sheet receiving station illustrating the stop assembly and feed table in their lower-most positions.

As feed slat 12a is moved into feed station 13 stop assembly 30 is in the down position of Figure 2 being urged to this position by tension springs 36 secured to the frame 35 and the horizontal extensions of the two outside paper stop fingers 32. Springs 36 urge rollers 38 mounted on arms 37 into engagement with paper stop operating cams 39. Stop assembly 30 comprises a hollow tubular member 31 extending transversely across the machine and carrying a plurality of spaced paper stop fingers 32, 33 and projecting upward from tubular member 31. Fingers 33 are pivotable so as to operate micro switches 34 for a purpose to be hereinafter explained. The ends of tube 31 are capped by members 40 which provide pivotal connections to arms 37 about pivots 41.

Each member 40 includes a fork 42, having a wide mouth, and a projection 43 operatively positioned to engage threaded member 46 extending through stop tab 45 which extends upwardly from arm 37, for the purpose of adjusting the angular play of stop assembly 30 about pivots 41. Springs 36 are operatively positioned to urge stop assembly 30 counterclockwise (with respect to Figure 2 about pivots 41 thereby urging projection 43 toward threaded member 46. In this manner inner surfaces 44 of forks 42 is positioned to engage feed slat rollers 48.

Arms 37 are pivoted to each side of frame 35 at pivots 47. Thus, as cam 39 is rotated from its position of Figure 2 to its position of Figure 3A, arms 37 will be pivoted counterclockwise (with respect to Figure 2) about pivots 47 to the upper position of Figure 3A. In moving from the position of Figure 2 to the position of Figure 3A indexing means comprising forks 42 engage complementary indexing means comprising rollers 48, carried by feed slat 12a near the ends thereof, thereby bringing paper stops 32, 33 to predetermined positions with respect to sheet grippers 50 carried by feed slat 12a.

It is to be noted that feed slat 12a is first rigidly positioned at feed station 13 and thereafter the stop assembly 30 is positioned with respect thereto. The cooperation between fork 42 and roller 48 establishes the predetermined position of stop assembly 30 relative to feed slat 12a with the pivotal connection at 41 permitting stop assembly 30 to assume this predetermined position.

Each of the grippers 40 are of the type fully described in my copending application (S–115) Serial No. 684,797, filed September 9, 1957, assigned to the assignee of the instant invention and entitled "Sheet Gripping Means For Cutting and Creasing Press." Briefly, each gripper 50 (Figure 4) comprises stationary lower jaw 51 and movable upper jaw 52, which extends through hollow feed slat 12a and is pivotally mounted at 53 to bracket 54 secured to slat 12a. Compression spring 55, positioned within hollow slat 12a, urges jaw 52 downward toward engagement with jaw 51. An opening 56 is provided in the bottom surface of slat 12a to permit gripper opening rod 57 to engage jaw 52 and thereby open gripper 50.

Each of the grippers 50 is supplied with an individual opening rod 57. Each rod 57 comprises a threadable member whose enlarged flat head 58 is engageable with upper jaw 52. Rods 57 are threadably mounted to transverse channel member 59 with lock nuts 60, 61 maintaining rod 57 in a fixed position relative to member 59. Each end of member 59 is secured to a post 62 which extends upwardly from a triangular member 63 and is pivoted thereto at 63a. Flat members 314 are secured to channel 59 adjacent to each of the ends thereof parallel to the web of channel 59. Rollers 312, in contact with flat members 314, and roller 313, in contact with the web of channel 59, journal the vertical movement of gripper opening rods 57.

Triangular members 63 are pivotally mounted to the frame 35 at each side thereof at pivots 64. Tension spring 65 is secured to one end thereof to hook 66 and at the other end thereof to hook 67 which is mounted to frame 35. Hook 66 is received by eye 66a which is secured to one end of threaded rod 67a which extends through an opening in tab 68a (Figure 3) bent outwardly from triangular member 63. Nut 69a is threaded to rod 67a and abuts tab 68a to provide a convenient means for adjusting the loading of spring 65. Thus, spring 65 bias triangular member 63 in a counterclockwise direction about pivot 64 (with respect to Figure 4) and in so doing urges roller 68, carried by triangular member 63, into engagement with gripper opening cam 69.

Figure 4:
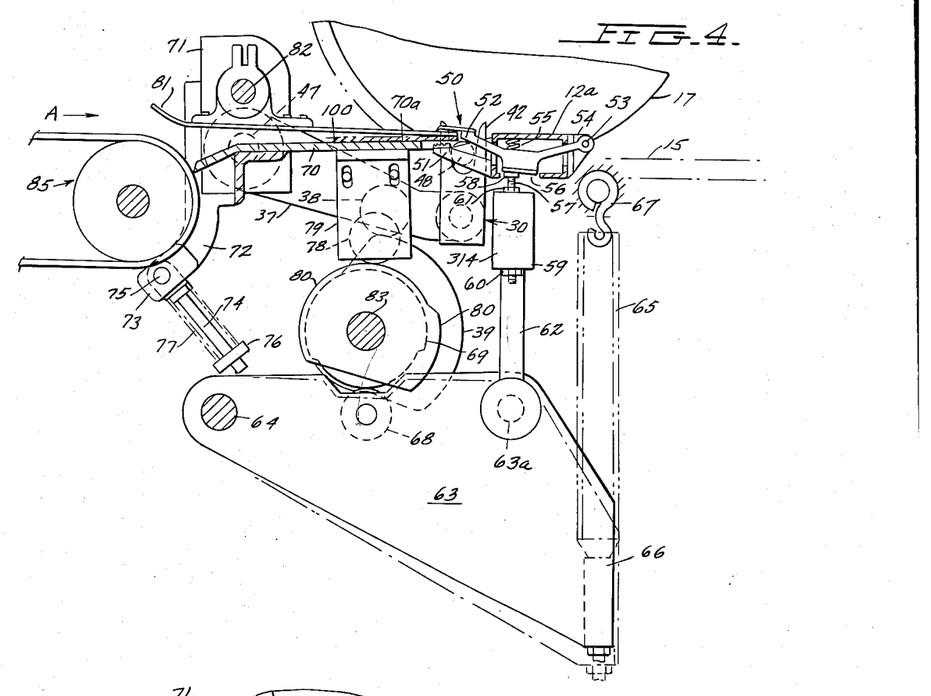
Figure 5:
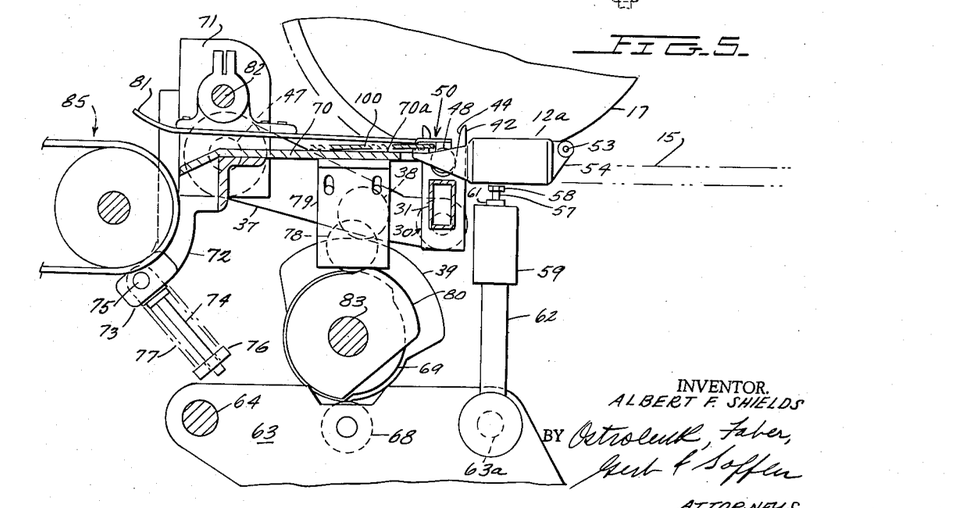
Figures 6, 7, 7A, 7B:
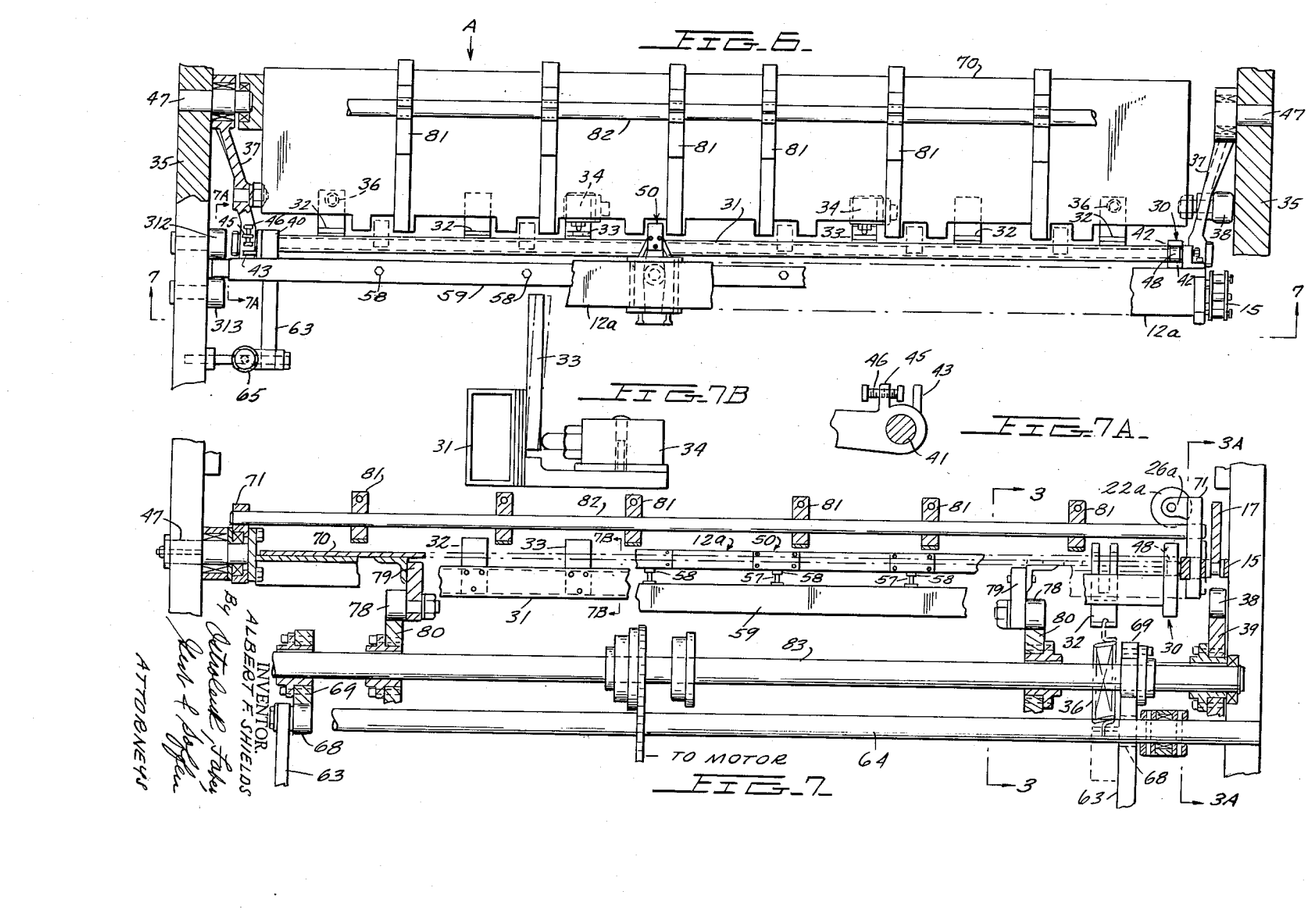
Figure 6 is a cross-section taken through line 6—6 of Figure 3 looking in the direction of arrows 6—6.
Figure 7 is a cross-section taken through line 7—7 of Figure 6 looking in the direction of arrows 7—7.
Figures 7A and 7B are cross-sections taken through lines 7A—7A and 7B—7B, respectively, of Figure 6 looking in the directions of the respective arrows.

In Figure 5 gripper opening cam 69 has moved rods 57 to a low position. When cam 69 is rotated to its position of Figure 4, rods 57 will be urged to a raised position by spring 65. It is to be noted that opening rods 57 are resiliently loaded members. Thus, should the machine experience a malfunction wherein rods 57 engage slat 12a rather than extending through openings 56 the machine will not be damaged.

A tiltable feed table 70 extends transversely across the machine at feed station 13 and is provided so as to guide the sheet 100 between jaws 51, 52 and also to support sheet 100 as it is being moved from receiving station 13 to cutting station 19. Vertical plates 71 are secured to feed table 70 at opposite sides of the machine. A member 72, having a curved inwardly extending end 73, is secured to member 72. Guide rod 74 is pivotally secured at 75 to end 73 and is slidable through an opening in bracket 76 which is secured to frame 35. Compression spring 77 bears against bracket 76 and end 73 of member 72 thereby urging member 72 and feed table 70 secured thereto in a clockwise direction about pivot 47. The biasing action of spring 77 maintains rollers 78, mounted to bracket means 79 secured to the bottom of feed table 70, in engagement with tilt table cam 80.

Thus, as cam 80 is rotated from its position of Figure 2 through the position of Figure 4 to the position of Figure 5, feed table 70 will first be in an extremely low position (Figure 2). In this position, feed table 70 is disposed so as not to interfere with feed slat 12a or grippers 50 carried thereby as they approach sheet receiving station 13. In Figure 4, feed table 70 is in its most raised position wherein the top surface 70a thereof is slightly above the lower jaw 51 of grippers 50. In Figure 5, upper surface 70a of feed table 70 is lowered slightly below the level of lower jaw 51.

A plurality of laterally spaced upper guide members 81 are fixedly secured to rod 82 which extends between plates 71. Thus, as feed table 70 is tilted about pivots 47 upper guides 81 are also tilted about pivots 47.

Figure 3:
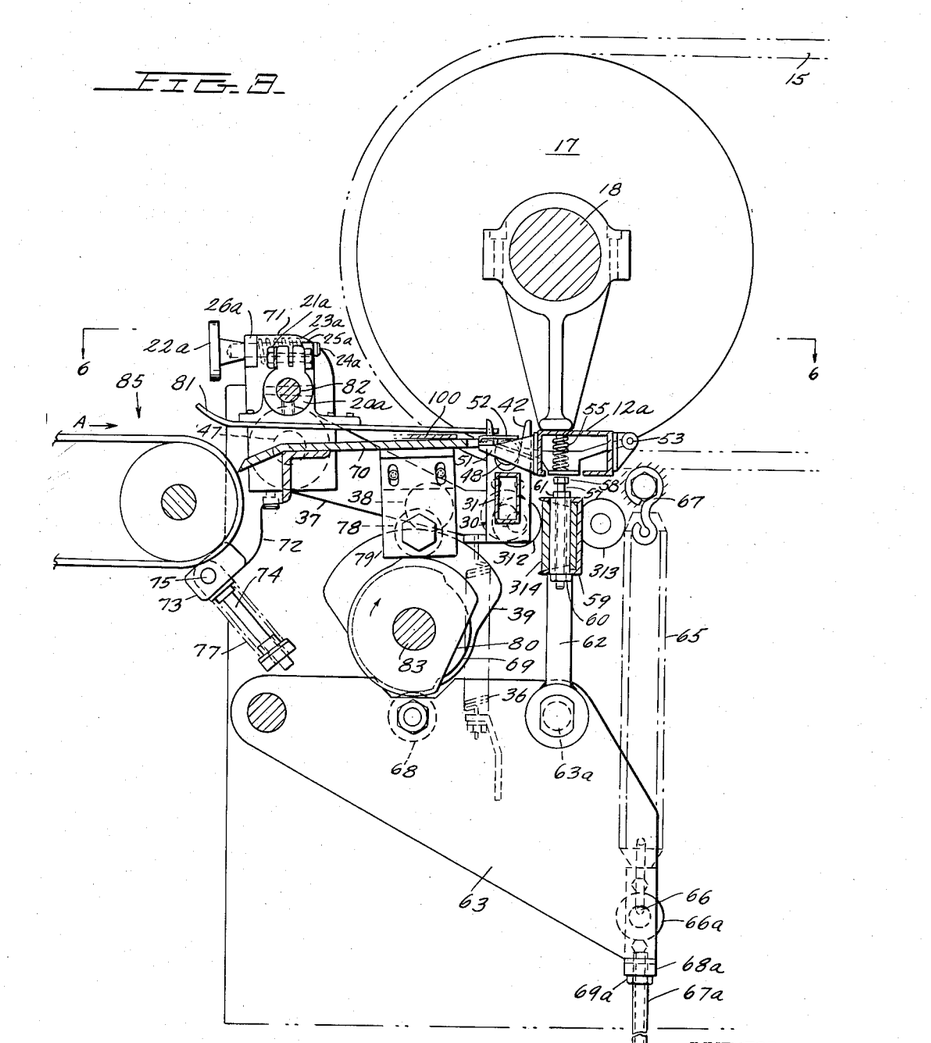
Figures 3 and 3A are cross-sections of Figure 7 taken along the lines 3—3 and 3A—3A, respectively, looking in the direction of the arrows.

Each upper guide member 81 is secured to a clamp member 20a which is held fast to shaft 82 by fastening means 21a (Figure 3). A gauged adjustment of guide members 81 so as to regulate the spacing between tiltable feed table 70 and members 81 is obtained by adjusting knob 22a. Compression spring 23a is positioned about threaded extensions 24a of knob 22a which is entered into a threaded formation in the upwardly projecting portion of member 25a which is rigidly secured to shaft 82.

Threaded extension 24a extends through a clearance hole in tab 26a which extends inwardly from plate 71. Spring 23a bears against tab 26a and member 25a thus biasing shaft 82 about its longitudinal axis in a clockwise direction with respect to Figure 3. The engagement between knob 22a and tab 26a limits the clockwise position of shaft 82 thereby establishing the spacing between guide members 81 and feed table 70.

Figure 3A:
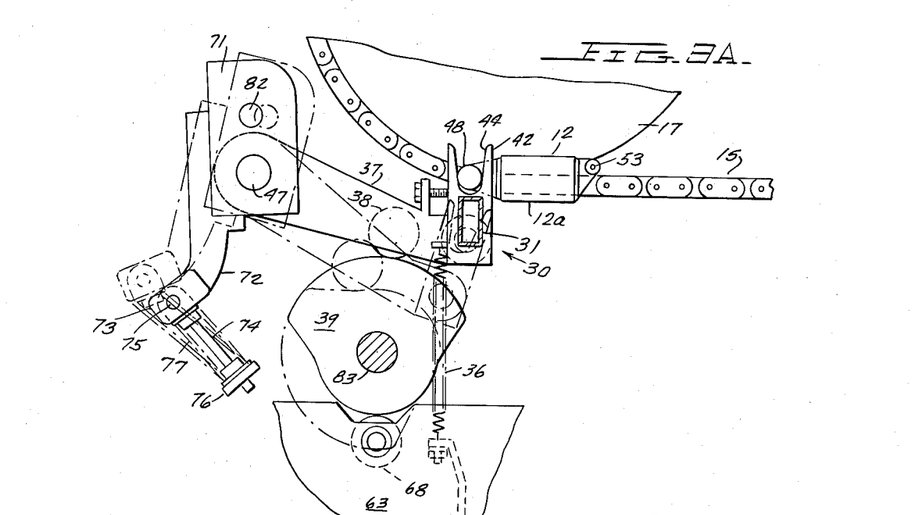

Paper stop cam 39, gripper opening cam 59, and tilt table cam 80 are all keyed to shaft 83 and are angularly arranged with respect to one another so as to achieve synchronized operation in the following manner. As feed slat 12a apraches feed station 13, tilt table 70 is in its lowermost position stop assembly 30 is in its low position and rods 57 are in their low positions. When feed slat 12a arrives at feed station 13 and is stopped thereat, stop assembly 30 is raised so that fork 42 thereof will engage roller 48 carried by feed slat 12a to bring stop assembly 30 to a predetermined position with respect to grippers 50 (Figure 3A).

Rods 57 are moved upwardly to raise upper jaw 52 and feed table 70 is tilted to its highest position. In this position, feed table 70 will guide sheet 100 between the opened jaws 51, 52 of grippers 50 as sheet 100 is fed in direction A by conveyor 85 (Figure 4) to be stopped by stops 32, 33. After sheet 100 is positioned between the open jaws 51, 52 feed table 70 is moved to its intermediate position of Figure 5, rods 57 are lowered thereby permitting spring 55 to move jaw 52 toward engagement with jaw 51 so that sheet 100 is securely held by grippers 50 and stop assembly 30 is moved to its low position of Figure 2.

The intermittent driving means then rotates driving sprockets 16, 17 to drive chains 14, 15, respectively, thereby moving feed slat 12a from sheet receiving station 13 toward cutting station 19. Feed table 70 remains in its intermediate position of Figure 5 in order to support sheet 100 until sheet 100 has cleared receiving station 13.

Micro switches 34 are provided to insure that sheet 100 is properly located with respect to feed slat 12a. That is, if sheet 100 is properly aligned with feed slat 12a both of the paper stops 33 will be deflected so as to operate their associated micro switches 34 which are connected in a well known manner to a circuit (not shown) which controls the driving power supplied by motor 95 to the machine. If either of the micro switches 34 is not operated by its associated paper stop 33 the circuit to motor 95 will be interrupted and the machine will stop operating. Other micro switches (not shown) paralleling micro switches 34 are operated by a cam means (not shown) mounted to cam shaft 83 so that the power to motor 95 will not be interupted while chains 14 and 15 are in motion.

*The cutting station*

When feed slat 12a arrives at the cutting station 19, slat 12a is stopped in a position occupied by feed slat 12b in Figure 1. In this position, sheet 100 is positioned between die 23 and pressure member 24.

Pressure member 24 is rocked by cams 25, 26 keyed to shaft 96, 97, respectively, which are driven by meshing bull gears 98, 99, respectively. Motor 95 is connected through chain 94 to drive pinion 93 which is in mesh with bull gear 99 thereby supplying driving power to both bull gears 98, 99. It is to be understood that through suitable gearing arangements, well known to the art, all of the operating power for the machine is supplied in a synchronized manner by motor 95.

As pressure member 24 is rocked by cam means 25, 26 so as to engage sheet 100 and force sheet 100 against die 23, fork 101 secured to the forward end of pressure member 24 moves in the direction indicated by arrow B so as to engage roller 48. It is to be noted that driving sprockets 16, 17 are positioned at feed station 13. With this arrangement, the upper flights of chains 14, 15 are taut and the slack in chains 14, 15 is concentrated in the lower flights thereof where the sheet carrying feed slat 12a—12e is positioned when stopped at the cutting station. Thus, as fork 101 engages roller 48, feed slat 12b is free to move to a predetermined position relative to pressure member 24. This moves sheet 100 to a predetermined position relative to die 23 so that accurate registration between the sheet 100 and die 23 is assured.

*The sheet stripping station*

Now referring more particularly to Figure 1, after sheet 100 has been operated upon at the cutting station 19, driving sprockets 16, 17 are once again rotated by the intermittent drive means and feed slat 12a is moved to stripping station 20 in a position coinciding with the position occupied by feed slat 12c in Figure 1.

Rod 102 is then moved in the direction indicated by arrow C moving slot 103 at the end of rod 102 in the direction of arrow C. The initial motion of rod 102 in the direction of arrow C enables loaded tension spring 104 to rotate pin 106 clockwise about shaft 107. Tension spring 104 is connected at one end thereof to pin 106 and at the other end thereof to threaded rod 104a. Rod 104a extends through an opening in frame bracket 105a and is engaged by nut 106a which provides a convenient means whereby the loading of spring 104 may be adjusted.

Pin 106 is mounted to member 107 so that a rotation of pin 106 will cause a rotation of shaft 107. Shaft 107 extends laterally across the machine and carries a plurality of laterally spaced fingers 108 keyed thereto. Fingers 108 each carry a button 109 which is positioned to extend through opening 56 and engage grippers 50 so as to separate jaws 51, 52 when shaft 107 is rotated in a clockwise direction with respect to Figure 1. After buttons 109 have opened grippers 50, at stripping station 20, the continuous motion of rod 102 in the direction C will not cause any damage since pin 110 secured to member 105 will slide in slot 103.

Three linkages 111, 112, 113 join rod 102 to shaft 115 which extends laterally across the machine. A plurality of stripping members 116 are laterally spaced along shaft 115 and are keyed thereto. Links 111–113 are so arranged that a motion of shaft 102 in the direction indicated by arrow C will result in a clockwise rotation of shaft 115 (with respect to Figure 1), which results in a clockwise rotation of stripping members 113. With arrangement illustrated, buttons 109 will first open grippers 50 and thereafter, if sheet 100 has not left the grippers due to the force of gravity, strippers 116 will engage sheet 100 to remove it from grippers 50. Suitable micro switches and circuitry (not shown) may be included at the stripping station to halt operation of the machine if sheet 100 is not stripped from the grippers 50.

*Positioning the die*

Figure 8:
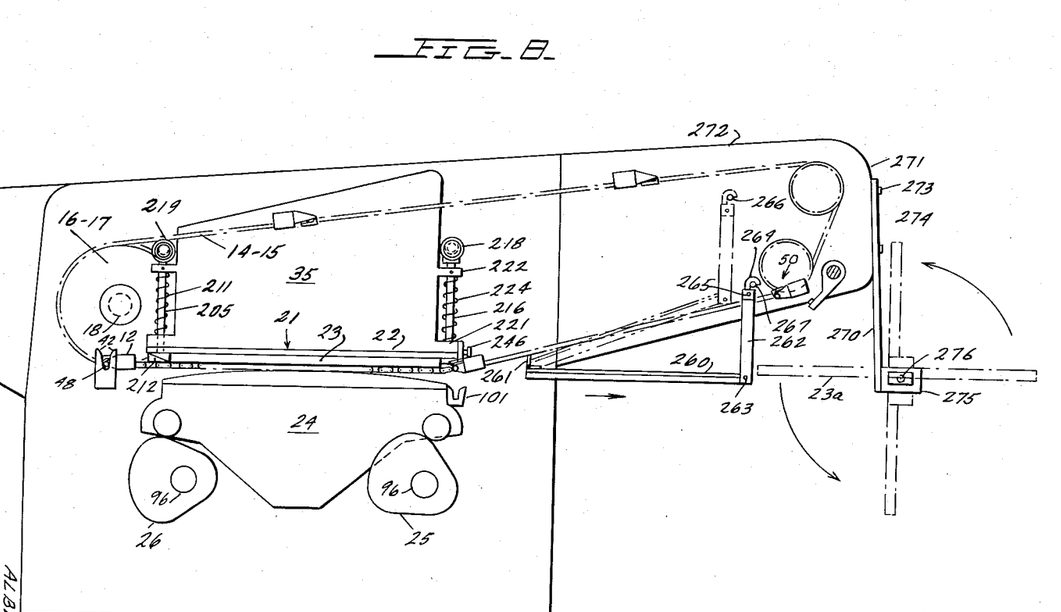
Figure 8 is a side elevation of the machine with the near side of the housing removed to show the means for replacing the die.
Figure 9:
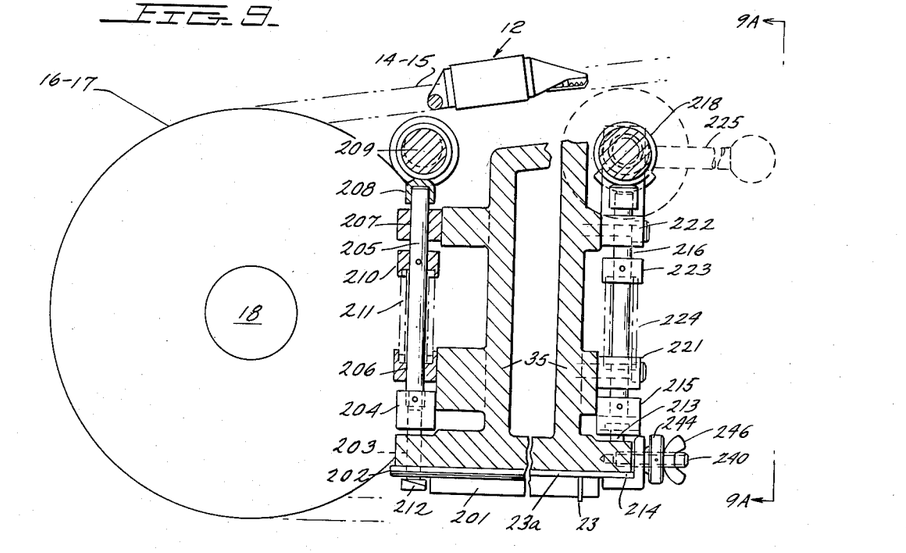
Figure 9 is a fragmentary cross-section illustrating the means for positioning and securing the die.
Figures 9A, 9B:
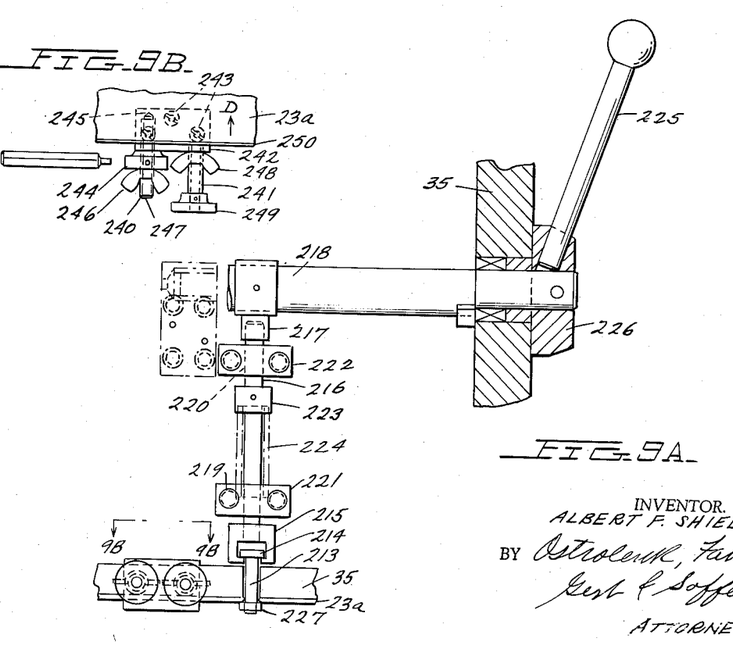
Figure 9A is a cross-section taken through line 9A—9A of Figure 9 looking in the direction of arrows 9A—9A.
Figure 9B is a cross-section taken through line 9B—9B of Figure 9A looking in the direction of arrows 9B—9B.

Now referring more particularly to Figures 8 and 9–9B, die 23 comprises a plurality of knifes secured to chase 23a which often comprises a ply-wood board. Rotatable members 201 are secured to chase 23 and positioned between the knifes to urge sheet 100 away from die 23 after the cutting and creasing operation. When die 23 is positioned at cutting station 19 the side edges of chase 23a are supported on tracks (not shown) which are located on opposite sides of frame 35.

Chase 23a is provided with at least one slot communicating with the rear edge 202 thereof. As die 23 is moved in a direction opposite to arrow A, the slots at the rear of chase 23a receive the bodies of T-bolts 203. Each T-bolt 203 is secured to a block 204 having rod 205 secured thereto. Rod 205 projects through aligned openings 206, 207 in frame 35 and a cap 208 at the upper end thereof abuts eccentric 209. A collar 210 is secured to rod 205 and provides an upper seat for compression spring 211 whose lower seat comprises frame 35. Thus, spring 211 is positioned to urge rod 205 upward so that the cap 208 thereon engages eccentric 209 extending transversely across the machine and is operable by means extending externally thereof.

As die 23 is moved into cutting station 19, eccentric 209 is in a position to hold rod 205 at its lower-most position. After die 23 is in place at the cutting station 19 eccentric 209 is rotated approximately 180° thereby permitting spring 211 to urge rod 205 upward so that the head of T-bolt 203 will firmly engage chase 23a forcing it snugly against frame 35.

At least one T-bolt 213 is secured to chase 23a near the forward edge 214 thereof with the head of T-bolt 213 being positioned above chase 23a and spaced therefrom. When die 23 is moved to the cutting station 19, the head 214 of T-bolt 213 is received by a C-shaped member 215 which is mounted to one end of rod 216, the other end of which is provided with cap 217 in engagement with eccentric 218 extending transversely across the machine. Rod 216 extends through aligned opening 219, 220 of frame members 221, 222, respectively. Collar 223 is secured to rod 216 and provides a seat for the upper end of compression spring 224 whose lower end is seated on frame member 221 thereby urging rod 216 upwardly.

As die 23 is moved into cutting station 19, handle 225, positioned externally of frame 35 and secured to eccentric 218 by means of collar 226, rotates eccentric 218 so as to force rod 216 to a downward position. After die 23 is positioned at cutting station 19, handle 225 is rotated approximately 180° so that eccentric 218 is positioned to permit spring 224 to urge rod 216 upwardly. C-shaped member 215 which grasps T-bolt 213 by the head 214 thereof, urges T-bolt 213 upwardly so as to firmly seat chase 23a against frame 35. Nut 227 secured to the end of T-bolt 213 and positioned adjacent to the lower surface of chase 23a serves to relieve the threads formed in chase 23a from supporting the rod imposed by spring 224.

A fine longitudinal adjustment for die 23 is accomplished by means of threaded studs 240 projecting from frame 35 forward of the cutting station 19, and a threaded member 241 threadably mounted to L-bracket 242. Screws 243 secure L-bracket 242 to the underside of chase 23a at the forward end 214 thereof. In order to move die 23 rearwardly knob 244 is rotated so as to move bracket 242 toward the rearward end 245 of stud 240. When die 23 has been moved to the desired position, locking wing nut 246 is turned on stud 240 until nut 246 abuts knob 244 thereby locking knob 244 in place.

If it is desired to move die 23 in a forward direction, or the direction of arrow A, lock nut 246 and knob 244 should both be rotated so that they move toward the forward end 247 of stud 240. Thereafter, locking wing nut 246 is moved away from bracket 242 toward knob 249 then knob 249 is rotated so as to move screw 241 in the direction indicated by arrow D. The end 250 of screw 241 engages frame 35 thereby forcing bracket 242 and chase 23a secured thereto in a direction opposite to arrow D, or in the direction of arrow A. When die 23 has been moved to the desired longitudinal position, lock nut 248 is turned on screw 241 until nut 248 abuts bracket 242 thereby locking screw 241 in position.

Two tracks 260 are each pivotally secured at one of their ends to opposite sides of the machine at pivots 261 which extend inwardly from frame 35. Upwardly extending members 262 are pivotally secured at 263 to the other ends of tracks 260. Hooks 264 are pivotally secured at 265 to the free ends of members 262.

During normal operation of the machine, hooks 264 engage rod 266 extending transversely across the machine thereby raising tracks 260 in an upward position indicated in phantom in Figure 8. When it is desired to remove die 23 from the machine, tracks 260 are moved to a low position, indicated in solid lines in Figure 8, with hooks 264 engaging rod 267 which extend transversely across the machine. In the lower position tracks 260 are located in the same plane as the tracks in the region of press 21.

When it is desired to remove die 23 from the machine, strips 270 are secured to the forward end 270 of the machine housing 272 by means of fasteners 273, 274. Blocks 275 are secured to forward extension at the lower ends of strips 270. When blocks 275 are in the horizontal position shown in the solid lines of Figure 8, track formations (not shown) carried thereby, are positioned in alignment with tracks 260 when they are placed in their lower positions. Blocks 275 are pivotally secured at 276 to the forwardly projecting extensions of strips 270.

Die 23 may be removed from the machine by rotating extensions 209 and 218 so that T-bolts 203 and C-members 215 no longer exert an upward force on chase 23a. Knob 244 and lock nut 246 are then removed from stud 240. Tracks 260 are moved to their lower position, blocks 275 are placed in their horizontal position and chase 23a is then drawn, in the direction indicated by arrow A from the region of press 21.

In the region between cutting station 19 and stripping station 20, chase 23a is supported by tracks 260. Continued movement in the direction of arrow A brings chase 23a to the horizontal position (indicated in the broken lines in Figure 8) wherein the rear edge 202 thereof is clear of tracks 260 and chase 23a is supported entirely by blocks 274. In this position, chase 23a may be bolted to blocks 275 and thereafter blocks 275 may be tilted to a vertical position (indicated in phantom in Figure 8) thereby moving chase 23a in the direction indicated by arrow G in Figure 8 to the vertical position indicated in phantom in Figure 8. In this vertical position die 23 is readily accessible for repairs or changes.

Replacement of the die 23 is accomplished by performing the previously recited steps in reverse order.

Although I have here described preferred embodiment of my novel invention, many variations and modifications will now be apparent to those skilled in the art, and I therefore prefer to be limited, not by the specific disclosure herein, but only by the appending claims.

I claim:

1. The combination comprising a sheet gripper means and a stop means; said gripper means being movable to a first station; indexing means carried by said stop means engageable with complementary indexing means carried by said sheet gripper means after said sheet gripper means has been moved to said first position whereby said stop means is moved to a precise predetermined position with respect to said sheet gripper means while said sheet gripper means remains stationary at said first station.

2. The combination comprising a sheet gripper means and a stop means; said gripper means being movable to a first station; indexing means carried by said stop means engageable with complementary indexing means carried by said sheet gripper means after said sheet gripper means has been moved to said first position whereby said stop means is moved to a precise predetermined position with respect to said sheet gripper means while said sheet gripper means remains stationary at said first station; said gripper means also being movable to a second station; a stationary member and a pressure member movable to force a sheet against said stationary member; said first and said second stations being positioned near a first and a second end, respectively, of said movable member; indexing means carried by said movable member engageable with complementary indexing means carried by said sheet gripper means after said sheet gripper means has been moved to said second station whereby said sheet gripper means is moved to a precise predetermined position with respect to said movable member as said movable member is moved into position to force a sheet held by said gripper means against said stationary member.

3. In combination a sheet gripper means movable into and out of a first station; said gripper means including a fixed lower jaw and a movable upper jaw; a table adjacent to said first position and operatively positionable to support a sheet being fed between said jaws when they are open; said table being movable to a first and a second position; said table when in said first position being in a plane extending between said jaws when they are parted; means operatively connected between said gripper means and said table whereby the operations of said gripper means and said table are synchronized.

4. The combination comprising a sheet gripper means and a stop means; said gripper means being movable to a first station; indexing means carried by said stop means engageable with complementary indexing means carried by said sheet gripper means after said sheet gripper means has been moved to said first station whereby said stop means is moved to a precise predetermined position with respect to said sheet gripper means while said sheet gripper means remains stationary at said first station; said gripper means including a fixed lower jaw and a movable upper jaw; a table adjacent to said first position and operatively positionable to support a sheet being fed between said jaws when they are open; said table being movable to a first and a second position; said table when in said first position being in a plane extending between said jaws when they are parted.

5. The combination comprising a sheet gripper means and a stop means; said gripper means being movable to a first station; indexing means carried by said stop means engageable with complementary indexing means carried by said sheet gripper means after said sheet gripper means has been moved to said first station whereby said stop means is moved to a precise predetermined position with respect to said sheet gripper means while said sheet gripper means remains stationary at said first station; said gripper means including a fixed lower jaw and a movable upper jaw engageable therewith; means operable when said gripper means is at said first station to open and close said jaws; a table adjacent to said first station and movable between a first and a second position; said table when in said first position being in a plane extending between said jaws when they are open; said table being in said first position while a sheet is being fed between said jaws; said table when in said second position being in a plane extending slightly below the upper surface of said fixed jaw; said table being in said second position while said jaws are being closed and while said gripper means is transporting a sheet through said first station.

6. The combination comprising a sheet gripper means and a stop means; said gripper means being movable to a first station; indexing means carried by said stop means engageable with complementary indexing means carried by said sheet gripper means after said sheet gripper means has been moved to said first station whereby said stop means is moved to a precise predetermined position with respect to said sheet gripper means while said sheet gripper means remains stationary at said first station; said gripper means including a fixed lower jaw and a movable upper jaw engageable therewith; means operable when said gripper means is at said first station to open and close said jaws; a table adjacent to said first station and movable between a first and a second position; said table when in said first position being in a plane extending between said jaws when they are open; said table being in said first position while a sheet is being fed between said jaws; said table when in said second position being in a plane extending slightly below the upper surface of said fixed jaw; said table being in said second position while said jaws are being closed and while said gripper means is transporting a sheet through said first station; said table also being movable to a third position below said second position prior to the arrival of said gripper means at said first station.

7. The combination comprising a sheet gripper means and a stop means; said gripper means being movable to a first station; indexing means carried by said stop means engageable with complementary indexing means carried by said sheet gripper means after said sheet gripper means has been moved to said first station whereby said stop means is moved to a precise predetermined position with respect to said sheet gripper means while said sheet gripper means remains stationary at said first station; said gripper means including a fixed lower jaw and a movable upper jaw engageable therewith; means operable when said gripper means is at said first station to open and close said jaws; a table adjacent to said first station and movable between a first and a second position; said table when in said first position being in a plane extending between said jaws when they are open; said table being in said first position while a sheet is being fed between said jaws; said table when in said second position being in a plane extending slightly below the upper surface of said fixed jaw; said table being in said second position while said jaws are being closed and while said gripper means is transporting a sheet through said first station; said table also being movable to a third position below said second position prior to the arrival of said gripper means at said first station; means operatively connected between said gripper means, said stop means, and said table whereby the operations of these three mechanisms are synchronized.

8. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said gripping means being rigidly positioned when stopped at said receiving station; a movable stop means at said receiving station; indexing means carried by said stop means engageable with indexing means carried by said gripping means whereby said stop means is movable to a first precise predetermined position with respect to said gripping means after said gripping means has been stopped at said receiving station; said stop means being moved to said first precise predetermined position while said gripping means is maintained in a fixed position.

9. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said gripping means being rigidly positioned when stopped at said receiving station; a movable stop means at said receiving station; indexing means carried by said stop means engageable with indexing means carried by said gripping means whereby said stop means is movable to a first precise predetermined position with respect to said gripping means after said gripping means has been stopped at said receiving station; said stop means being moved to said first precise predetermined position while said gripping means is maintained in a fixed position; indexing means carried by said pressure member engageable with said indexing means carried by said gripping means whereby said gripping means, after being stopped at said cutting station, is movable to a precise predetermined position with respect to said pressure member as said pressure member moves in a direction to raise a sheet held by said gripping means against said die.

10. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said gripping means being rigidly positioned when stopped at said receiving station; a movable stop means at said receiving station; indexing means carried by said stop means engageable with indexing means carried by said gripping means whereby said stop means is movable to a precise predetermined position with respect to said gripping means after said gripping means has been stopped at said receiving station; indexing means carried by said pressure member engageable with said indexing means carried by said gripping means whereby said gripping means, after being stopped at said cutting station, is movable to a precise predetermined position with respect to said pressure member as said pressure member moves in a direction to raise a sheet held by said gripping means against said die; said indexing means comprising a forked element and a roller engageable by said forked member.

11. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said gripping means including a fixed lower jaw and a movable upper jaw engageable therewith; means operable when said gripper means is at said receiving station to open and close said jaws; a table adjacent to said receiving station and movable between a first and a second position; said table when in said first position being in a plane extending between said jaws when they are open; said table being in said first position while a sheet is being fed between said jaws; said table when in said second position being in a plane extending slightly below the upper surface of said fixed jaw; said table being in said second position while said jaws are being closed and while said gripping means is transporting a sheet through said receiving station.

12. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said gripping means including a fixed lower jaw and a movable upper jaw engageable therewith; means operable when said gripping means is at said receiving station to open and close said jaws; a table adjacent to said receiving station and movable between a first and a second position; said table when in said first position being in a plane extending between said jaws when they are open; said table being in said first position while a sheet is being fed between said jaws; said table when in said second position being in a plane extending slightly below the upper surface of said fixed jaw; said table being in said second position while said jaws are being closed and while said gripping means is transporting a sheet through said receiving station; said table also being movable to a third position below said second position prior to the arrival of said gripping means at said receiving station.

13. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and cutting stations; said gripping means being rigidly positioned when stopped at said receiving station; a movable stop means at said receiving station; indexing means carried by said stop means engageable with indexing means carried by said gripping means whereby said stop means is movable to a precise predetermined position with respect to said gripping means after said gripping means has been stopped at said receiving station; indexing means carried by said pressure member engageable with said indexing means carried by said gripping means whereby said gripping means, after being stopped at said cutting station, is movable to a precise predetermined position with respect to said pressure member moves in a direction to raise a sheet held by said gripping means against said die; said table also being movable to a third position below said second position prior to the arrival of said gripping means at said receiving station.

14. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said press including a frame; a pair of tracks mounted on said frame and extending forward of said cutting station toward a forward end of said frame; said tracks being positionable to support said die and thereby permit said die to slide along said tracks in said first direction for removal of said die from said press.

15. A cutting and creasing press for sheet material, said press comprising a pressure member adapted to raise a sheet against a die, a gripping means for engaging the leading edge of a sheet prior to its entry into the press, driving means for transporting the sheet in a first direction through the press from a rear end to a front end thereof; said driving means being continuously connected to said gripping means; said gripping means remaining continuously in engagement with the leading edge of the sheet during the transport of the sheet through said press; a sheet receiving station positioned rearwardly of said rear end and a cutting station positioned in the region of said front end; said driving means being operatively connected to said gripping means to successively stop said gripping means at said receiving and said cutting stations; said press including a frame; a pair of tracks mounted on said frame and extending forward of said cutting station toward a forward end of said frame; said tracks being positionable to support said die and thereby permit said die to slide along said tracks in said first direction for removal of said die from said press; said tracks including a portion thereof tiltable about a pivot secured to said forward end of said frame whereby said die may be tilted to a vertical position.

16. A cutting and creasing press comprising a stack support, a die support adapted to carry a die and a pressure member operable against a die on said die support; a cam means for imparting a rocking motion to said pressure member; sheet conveying means between said stack support and die support and pressure member; means for feeding a sheet from the stack to said conveyance means; conveyance means moving said sheet toward said die support and pressure member; a movable gripping member comprising a plurality of complementary movable and stationary jaws for engaging the leading edge of the sheet as it approaches said die support and pressure member; means for halting said gripping member at a sheet receiving station before the point of entry of the sheet between said die support and pressure member; means operable after said gripping has engaged the leading edge of the sheet for moving said gripping member in a plane parallel to said die support to draw said sheet between said die and pressure member; means for stopping said gripping member and said sheet at a cutting station wherein said sheet is between said die and said pressure member; registry means for thereafter positioning said gripping member in a predetermined position with respect to said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released.

17. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary movable and stationary jaws for engaging the leading edge of the sheet as it approaches said die support and pressure member; means for halting said gripping member at a sheet receiving station before the point of entry of the sheet between said die support and pressure member; a sheet stop means having a first registry means secured thereto and engageable with a second registry means secured to said gripping member whereby said stop means is moved to a first precise predetermined position relative to said gripping member after said gripping member is halted at said receiving station; said stop means being moved to said first precise predetermined position while said gripping means is maintained in a fixed position; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released.

18. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary movable and stationary jaws for engaging the leading edge of the sheet at it approaches said die support and pressure member; means for halting said gripping member at a sheet receiving station before the point of entry of the sheet between said die support and pressure member; a sheet stop means having a first registry means secured thereto and engageable with a second registry means secured to said gripping member whereby said stop means is moved to a first precise predetermined position relative to said gripping member after said gripping member is halted at said receiving station; said stop means being moved to said first precise predetermined position while said gripping means is maintained in a fixed position; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; registry means for thereafter positioning said gripping member in a predetermined position with respect to said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping member; said gripping members being spaced so that, when one gripping member is at said receiving station, a second gripping member is at said cutting station, and a third gripping member is at said stripping station at which the sheet is to be released.

19. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary upper movable and lower stationary jaws for engaging the leading edge of the sheet as it approaches said die support and pressure member; means for halting said gripping member at a sheet receiving station before the point of entry of the sheet between said die support and pressure member; a table adjacent to said receiving station and movable between a first and a second position; said table when in said first position being in a plane extending between said jaws when they are open; said table being in said first position while a sheet is being received by said gripping member; said table when in said second position being in a plane extending slightly below the upper surfaces of said stationary jaws; said table remaining in said second position while said jaws are being closed and while said gripping member is drawing a sheet through said receiving station; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter operating said pressure member to press said sheet on said die; means for thereafter moving said gripping member to draw said sheet to a stripping station wherein said sheet is free of said die and away from the space between the die and pressure member; means for thereafter halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released.

20. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary movable and stationary jaws for engaging the leading edge of the sheet as it approaches said die support and pressure member; means for halting said gripping member at a sheet receiving station before the point of entry of the sheet between said die support and pressure member; a sheet stop means having a first registry means secured thereto and engageable with a second registry means secured to said gripping member whereby said stop means is moved to a predetermined position relative to said gripping member after said gripping member is halted at said receiving station; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released; said continuous member comprising a chain; a driving sprocket for said chain positioned at said receiving station; said chain including a first link thereof secured directly to said gripping member; said first link being in engagement with said sprocket when said gripping member is halted at said receiving station whereby said gripping member is rigidly positioned at said receiving station.

21. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary upper movable and lower station jaws for engaging the leading edge of the sheet as it approaches said die support and pressure member; means for halting said gripping member at a sheet receiving station before the point of entry of the sheet between said die support and pressure member; a sheet stop means having a first registry means secured thereto and engageable with a second registry means secured to said gripping member whereby said stop means is moved to a predetermined position relative to said gripping member after said gripping member is halted at said receiving station; a table adjacent to said receiving station and movable between a first and a second position; said table when in said first position being in a plane extending between said jaws when they are open; said table being in said first position while a sheet is being received by said gripping member; said table when in said second position being in a plane extending slightly below the upper surfaces of said stationary jaws; said table remaining in said second position while said jaws are being closed and while said gripping member is drawing a sheet through said receiving station; said table also being movable to a third position below said second position prior to the arrival of said gripping member at said receiving station; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter positioning said gripping member in a predetermined position with respect to said pressure member; means for thereafter operating said pressure member to press said sheet on said die; means for thereafter moving said gripping member to draw said sheet to a stripping station wherein said sheet is free of said die and away from the space between the die and pressure member; means for thereafter halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station; and a third gripping member is at said stripping station at which the sheet is to be released; said continuous member comprising a chain; a driving sprocket for said chain positioned at said receiving station; said chain including a first link thereof secured directly to said gripping member; said first link being in engagement with said sprocket when said gripping member is halted at said receiving station whereby said gripping member is rigidly positioned at said receiving station.

22. A cutting and creasing press comprising a stack support, a die support adapted to carry a die and a pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary movable and stationary jaws for engaging the leading edge of the sheet as it approaches said die support and pressure member; means for halting said gripping member at a sheet receiving station before the point of entry of the sheet between said die support and pressure member; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released; said press including a frame and a track means mounted to said frame and operatively positionable to support a die being moved in a horizontal position toward or away from said die support; said track means extending in a direction travelled by a sheet through said press.

23. A cutting and creasing press comprising a stack support, a die support adapted to carry a die and a pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary movable and stationary jaws for engaging the leading edge of the sheet as it approaches said die support and pressure member; means for halting said gripping member at a sheet receiving station before the point of entry of the sheet between said die support and pressure member; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter operating said pressure member to press said sheet on said die; means for thereafter moving said gripping member to draw said sheet to a stripping station wherein said sheet is free of said die and away from the space between the die and pressure member; means for halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released; said press including a frame and a track means mounted to said frame and operatively positionable to support a die being moved in a horizontal position toward or away from said die support; said track means extending in a direction travelled by a sheet through said press; said track means including a portion thereof tiltable about a point secured to said frame at a position beyond said stripping station whereby said die may be tilted to a vertical position.

24. A cutting and creasing press comprising a stack support, a die support adapted to carry a die and pressure member operable against a die on said die support; a cam means for imparting a rocking motion to said pressure member; sheet conveying means between said stack support and die support and pressure member; means for feeding a sheet from the stack to said conveyance means; said conveyance means moving said sheet toward said die support and pressure member; a movable gripping member comprising a plurality of complementary upper movable and lower station jaws for engaging the leading edge of the sheet as it approaches said die support and pressure member; means for halting said gripping member at a sheet receiving station before the point of entry of the sheet between said die support and pressure member; a sheet stop means having a first registry means secured thereto and engageable with a second registry means secured to said gripping member whereby said stop means is moved to a predetermined position relative to said gripping member after said gripping member is halted in a fixed position at said receiving station; a table adjacent to said receiving station and movable between a first and a second position; said table when in said first position being in a plane extending between said jaws when they are open; said table being in said first position while a sheet is being received by said gripping member; said table when in said second position being in a plane extending slightly below the upper surfaces of said stationary jaws; said table remaining in said second position while said jaws are being closed and while said gripping member is drawing a sheet through said receiving station; means operable after said gripping member has engaged the leading edge of the sheet for moving said gripping member in a plane parallel to said die support to draw said sheet between said die and pressure member; means for stopping said gripping member and said sheet at a cutting station wherein said sheet is between said die and said pressure member; means for thereafter positioning said gripping member in a predetermined position with respect to said pressure member; means for thereafter operating said pressure member to press said sheet on said die; means for thereafter moving said gripping member to draw said sheet to a stripping station wherein said sheet is free of said die and away from the space between the die and pressure member; means for thereafter halting said gripping member and sheet at said stripping station; means for thereafter releasing said sheet from said gripping member; a continuous member supporting a plurality of said gripping members; said gripping members being spaced so that, when one gripping member is at said receiving station, a second gripping member is at said cutting station, and a third gripping member is at said stripping station at which the sheet is to be released; said press including a frame and a track means mounted to said frame and operatively positionable to support a die being moved in a horizontal position toward or away from said die support; said track means extending in a direction travelled by a sheet through said press; said track means including a portion thereof tiltable about a point secured to said frame at a position beyond said stripping station whereby said die may be tilted to a vertical position.

References Cited in the file of this patent

UNITED STATES PATENTS

| | | |
|---|---|---|
| 2,258,880 | Bobst | Oct. 14, 1941 |
| 2,406,205 | Davidson et al. | Aug. 20, 1946 |
| 2,512,084 | Bobst | June 20, 1950 |
| 2,756,995 | Koch | July 31, 1956 |